United States Patent [19]

De Luca et al.

[11] Patent Number: 4,470,102
[45] Date of Patent: Sep. 4, 1984

[54] WALL MOUNTED DISTRIBUTION FRAME FOR TELEPHONE SUBSCRIBER LOCATIONS

[75] Inventors: Paul V. De Luca, Plandome Manor; Albert Atun, Valley Stream, both of N.Y.

[73] Assignee: Porta Systems Corp., Syosset, N.Y.

[21] Appl. No.: 422,588

[22] Filed: Sep. 24, 1982

[51] Int. Cl.³ ............................................. H04Q 1/14
[52] U.S. Cl. ..................................... 361/428; 174/59; 179/98
[58] Field of Search .................. 174/38, 48, 59, 60; 361/426, 427, 428, 429; 179/98; 339/198 R, 198 J

[56] References Cited

U.S. PATENT DOCUMENTS 4,150,867 4/1979 Knickerbocker .............. 361/426 X
4,160,880 7/1979 Brey ..................................... 179/98

Primary Examiner—John Gonzales
Assistant Examiner—D. A. Tone
Attorney, Agent, or Firm—Charles E. Temko

[57] ABSTRACT

A compact wall mounted distributing frame specifically adapted to terminate and protect incoming subscriber pairs at the subscriber location. Protection is afforded to small private automatic exchanges, key systems, both electronic and standard, as well as cross current fields.

3 Claims, 5 Drawing Figures

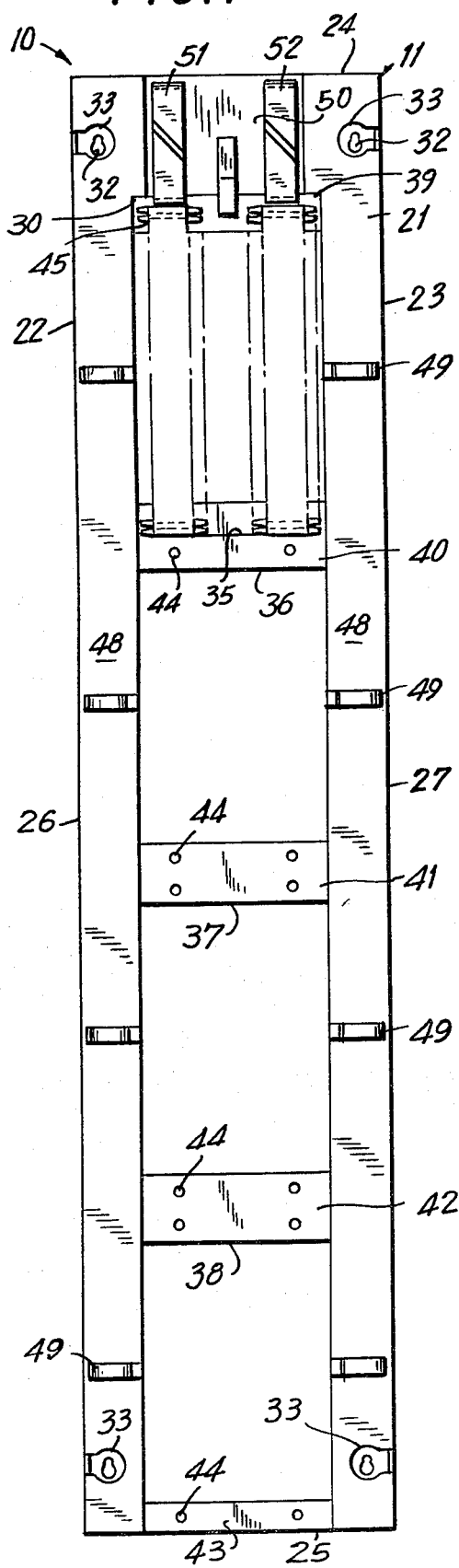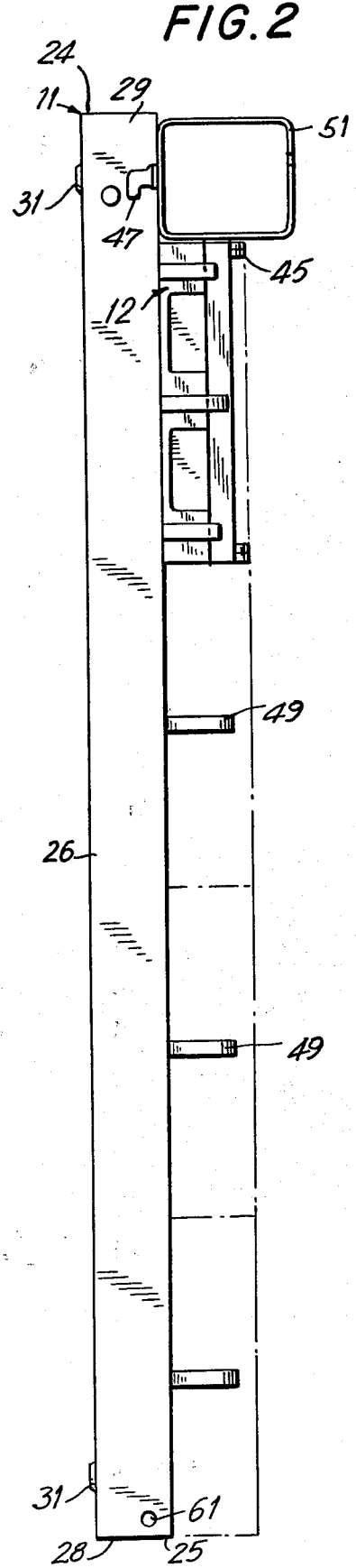

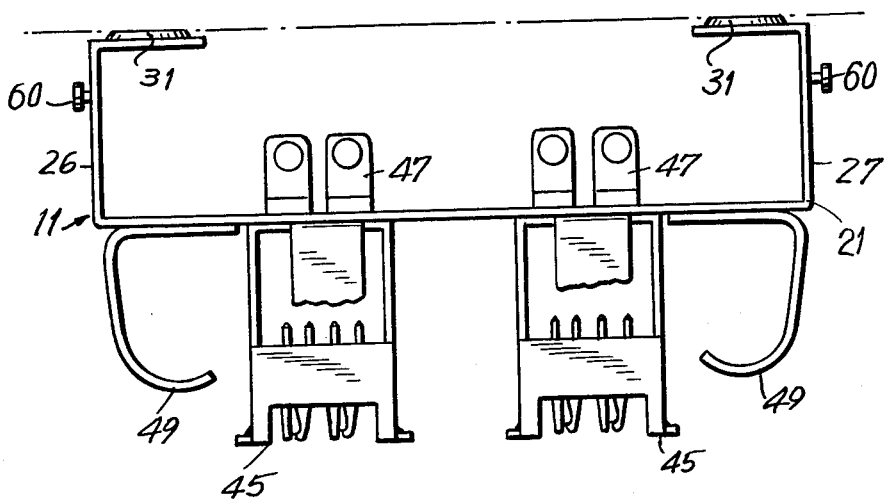
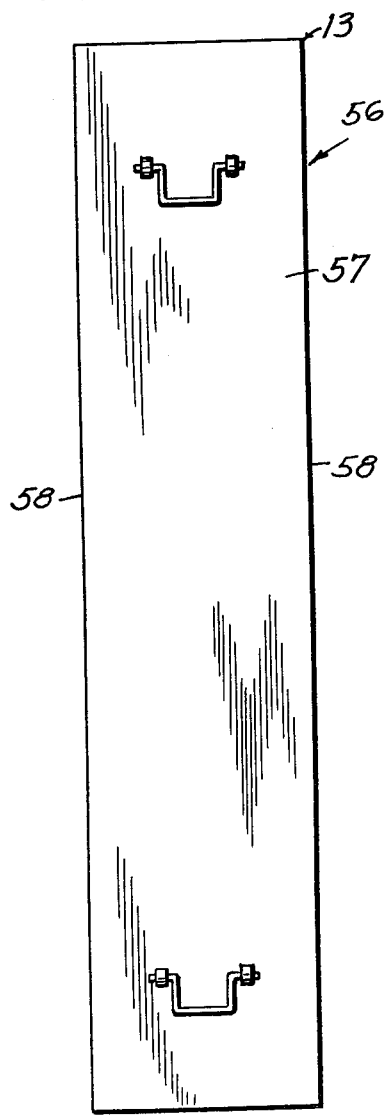
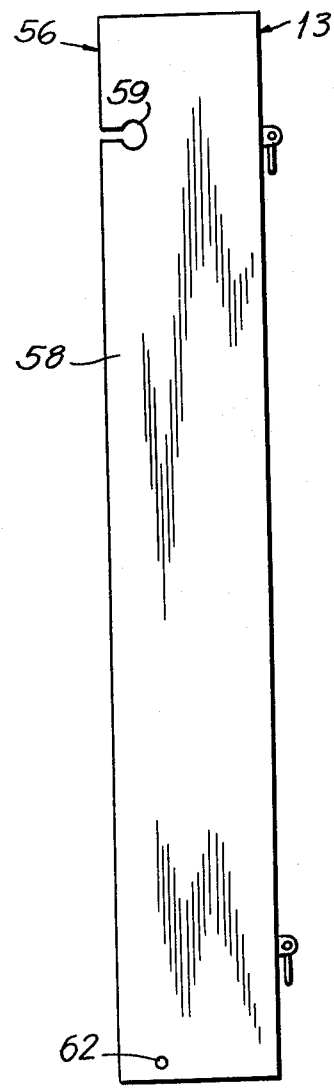

WALL MOUNTED DISTRIBUTION FRAME FOR TELEPHONE SUBSCRIBER LOCATIONS

BACKGROUND OF THE INVENTION

This invention relates generally to the field of telephony, and more particularly to an improved compact wall mounted distributing frame particularly adapted to terminate and protect incoming pairs at the subscriber location.

In the last several decades, there has been markedly increased use of customer-owned equipment at the customer location. This includes not only relatively simple devices such as recorders, but, as is the case with larger organizations, it is common to provide private automatic exchanges for direct telephone communication, as well as key systems, both of which require substantially sized crossed connect fields. As is to be expected, the telephone companies have provided for adequate protection of their incoming lines to prevent damage to expensive telephone office equipment, in the form of exposure to excess current surges caused by falling power lines, lightning strikes and the like. The companies also provide a measure of protection at the point of entry to the subscriber building, but such protection, usually designed and manufactured many years ago, is totally inadequate for the protection of sophisticated equipment, much of it with solid state electronic circuits, now installed by subscribers.

There are problems inherent in the installation of on site protection which are not present in the installation of central office equipment. Among these are substantial space limitations, and the high labor costs inherent in wire stripping, wire wrapping and soldering of connections. There is also the problem of tampering with circuits which are exposed in areas outside the control of the subscriber, example being common hallways and passageways.

SUMMARY OF THE INVENTION

Briefly stated, the invention contemplates the provision of an improved compact distributor frame of wall-mounted type in which space requirements for a given number of protected and distributed pairs has been reduced to a minimum. The frame is adapted to mount standard Western Electric Type 66 housings with snap mount brackets. The housings in turn support a variety of connectorized blocks, each capable of varying functions required by the installation. The frame is of elongated configuration, and may be mounted in parallel abutted relation with other similar brackets, this relationship being possible by the provision of inner troughs which underlie the snap mount brackets. Additional wiring accommodation is provided by synthetic resinous jumper retainers which are positioned on an exposed surface of the frame adjacent to the snap mount brackets, the jumper retainers also being snap mounted, where desired.

BRIEF DESCRIPTION OF THE DRAWING

In the drawing, to which reference will be made in the specification, similar reference characters have been employed to designate corresponding parts throughout the several views.

FIG. 1 is a front elevational view of an embodiment of the invention, with an optional cover element removed.

FIG. 2 is a side elevational view thereof.
FIG. 3 is a top plan view thereof.
FIG. 4 is a front elevational view of a cover element.
FIG. 5 is a side elevational view of the cover element.

DETAILED DESCRIPTION OF THE DISCLOSED EMBODIMENT

In accordance with the invention, the device, generally indicated by reference character 10, comprises broadly: a base element 11, a plurality of mounting bracket elements 12, and a cover element 13.

The base element 11 is preferably formed as a shaped metallic stamping, and includes a rectangular base wall 21 bounded by side edges 22 and 23, an upper edge 24 and a lower edge 25. Communicating at the side edges 22 and 23 are a pair of rectangular side walls 26 and 27 each being bordered by a lower end edge 28, an upper end edge 29 and an inner edge 30. Mounting tabs 31, four in number, are provided with keyhole openings 32 to permit screw mounting to a wall or other vertical supporting surface. Overlying the openings 32 are larger openings 33 in the base wall 21 to permit access to the openings 32.

Extending through the plane of the base wall 21 and communicating with a trough 34 formed by the base element 11 and the mounting surface (not shown) are a plurality of aligned rectangular openings 35, 36, 37, and 38. The openings are separated by cross bars 39, 40, 41, 42, and 43, each being provided with openings 44 for the reception of snap-in connectors (not shown) on the mounting bracket elements 12.

The mounting bracket elements 12 are preferably of a known type currently manufactured, and usually referred to in the art as a Western Electric Type 66 bracket. Accordingly, a detailed description of the bracket elements 12 is beyond the scope of the present disclosure. Such brackets are available with snap-on fasteners of resilient type which penetrate the openings 44 to position the bracket to overlie the openings 35–38, inclusive. The brackets in turn mount any of a wide variety of protector or other type blocks 45 (see FIG. 2), depending upon the particular requirements of the installation. Such blocks are normally provided with connector elements 47 to facilitate their interconnection with wiring disposed in the trough therebeneath.

Bordering the openings 40–44 are elongated peripheral areas 48 which are provided with jumper retainers 49 for the retention of conductors (not shown) for circuits having an appearance on the supported blocks.

A transverse area 50 at the top of the base element is provided with a pair of jumper trough forming members 51 and 52 which accommodate not only conductors supported on the areas 48, but conductors coming from adjacent devices mounted upon the same supporting surface.

The cover element 13 is optional, and is particularly useful where one or more devices 10 are, of necessity, mounted upon a wall surface disposed in an area not subject to the control of the subscriber. Examples of such locations are hallways and the like leading to private offices in a single building. The element 56 includes a front wall 57, and a pair of side walls 58, each side wall defining a slotted opening 59 adapted to engage corresponding studs 60 (see FIG. 3) on the the side walls 26 and 27. The side walls are provided with a locking hole 61 which underlies a corresponding hole 62 on the side walls 58 to permit engagement of a padlock (not shown), or other locking means.

We wish it to be understood that we do not consider the invention limited to the precise details of structure shown and set forth in this specification, for obvious modifications will occur to those skilled in the art to which the invention pertains.

We claim:

1. An improved telephone wall mounted distributing frame comprising: a base element of generally elongate configuration, including a planar base wall, a pair of side walls joining said base wall along elongated edges thereof, said side walls having means for mounting said base element upon a supporting surface, wherein said base wall, side walls, and supporting surface define a hollow trough; said base wall having through openings therein of rectangular configuration communicating with said trough, said openings being bordered by peripheral transversely extending portions of said base wall having cooperating means thereon for the mounting of standardized block mounting brackets, said opening being also bordered by longitudinally extending peripheral areas of said base wall, said last mentioned areas having jumper retaining members for the accommodation of longitudinally extending wires; a transversely extending area at at least one end of said base wall, and at least one trough-forming member supported upon said area and open at the ends thereof.

2. A distribution frame in accordance with claim 1, further comprising a detachable cover element having a front wall and a pair of side walls adapted to overlie said base element.

3. A distributing frame in accordance with claim 2, including means for locking said cover element in engaged condition upon said base element.

* * * * *